United States Patent [19]

Krichever et al.

[11] Patent Number: 4,923,281

[45] Date of Patent: May 8, 1990

[54] LASER DIODE FOCUSING MODULE, METHOD OF FABRICATING, AND METHOD OF USING

[75] Inventors: Mark Krichever, Hauppauge; Yuri Gofman, Brooklyn, both of N.Y.

[73] Assignee: Symbol Technologies Inc., Bohemia, N.Y.

[21] Appl. No.: 265,549

[22] Filed: Nov. 1, 1988

[51] Int. Cl.$^5$ .............................................. G02B 7/02
[52] U.S. Cl. .................... 350/245; 350/252; 350/255; 350/320
[58] Field of Search ............... 350/245, 252, 255, 257, 350/320

[56] References Cited

U.S. PATENT DOCUMENTS

| | | | |
|---|---|---|---|
| 3,583,742 | 6/1971 | Jones et al. | 350/255 |
| 4,387,297 | 6/1983 | Swartz et al. | 235/462 |
| 4,409,470 | 10/1983 | Shepard et al. | 235/472 |
| 4,431,267 | 2/1984 | Finck et al. | 350/252 |
| 4,460,120 | 7/1984 | Shepard et al. | 235/472 |
| 4,541,689 | 9/1985 | Howard et al. | 350/252 |
| 4,578,571 | 3/1986 | Williams | 235/472 |
| 4,673,805 | 6/1987 | Shepard et al. | 235/472 |
| 4,736,095 | 4/1988 | Shepard et al. | 235/472 |
| 4,743,091 | 5/1988 | Gelbart | 350/252 |
| 4,758,717 | 7/1988 | Shepard et al. | 235/472 |
| 4,760,248 | 7/1988 | Swartz et al. | 235/472 |
| 4,808,804 | 2/1989 | Krichever et al. | 235/462 |

*Primary Examiner*—Bruce Y. Arnold
*Assistant Examiner*—Loha Ben

[57] ABSTRACT

A focusing module for divergent light emitted from a source such as a laser diode. The focusing module consists of telescoping cylindrical members which focus by sliding the members along their central axis and permanently adhering the members to each other after focusing. The focusing lens is embodied in a lens assembly which prevents direct contact between the lens surface and the lens seat in one of the cylindrical members. Axial rotation between the cylindrical members, and between the base and the module is prevented by a series of notch and key elements. Consequently, the opening of the focusing module is fixed with respect to the cross-section of the light emitted, and can be shaped to match the cross section of the laser light beam thereby permitting maximum emission of focused light.

37 Claims, 4 Drawing Sheets

LASER DIODE FOCUSING MODULE, METHOD OF FABRICATING, AND METHOD OF USING

BACKGROUND OF THE INVENTION

1. Field of the Invention

The present invention generally relates to a focusing module for use with a divergent light source, and more particularly, the invention relates to a focusing module for a laser diode which can be adjusted to focus the output of such a diode prior to being affixed in a permanent focused position.

2. Description of the Prior Art

Various means for generating a laser beam are known in the prior art and may include a light source such as a laser tube or a semiconductor laser diode of a continuous wave or pulse type. A laser diode is much smaller in size and lighter in weight relative to a laser tube and therefore is particularly desirable for applications where size and weight requirements are to be minimized. One such application is a small, light weight hand held bar code scanner such as that described in U.S. Pat. No. 4,496,831. However, laser diodes emit a beam of light which diverges as the light moves outwardly along a centralized axis of emission. Typical laser diode light diverges 10°–20° in one plane through the axis of emission and 40°–50° in a second plane through the axis of emission normal to the first plane. The axis of emission is defined as the axis around which the light diverges symmetrically.

Such angular divergence is unacceptable for bar code scanning applications, which require a beam spot, preferably rectangular in cross-section having a relatively well defined edge. To achieve such a beam spot with the light of a laser diode, the divergence must be reversed using a lens system, thereby converging or focusing the light's intensity to a well defined spot at the point at which the bar code is to be read.

In the prior art, such lens systems for converging and focusing emitted laser diode light were embodied in one of a series of co-axial cylindrical members, one of which received the laser diode and was affixed thereto. The member remote from the diode was closed, having a circular opening therein which was coaxial with the emission axis of the diode and the central axis of the member supporting the diode. This opening allowed emission of the now converging beam, which was focused by the lens at a position located a distance from the emitter of the diode along the above axis. The lens was mounted in the member remote from the diode. Motion of the lens in the axial direction was prevented by providing a force such as from a compressed spring which extended the interior length of the two members and was coaxial with the central axis the cylindrical members, where one end engaged the lens and its opposite end rested on the washer-like face which defined the emission aperture of the received laser diode.

Movement in the axial direction was permitted through a construction whereby the members were provided with threaded portions on the interior or exterior surface which contacted the other member and interfaced with the corresponding threaded portion on the surface of the other member. These threads allowed one member to be rotated with respect to the other, changing their relative positions along the central axis, and consequently moving the lens system along the central axis with respect to the laser diode. Therefore, by rotating the cylindrical members with respect to one another, the focus of the laser light was adjusted.

The lens system of the prior art suffered from a number of disadvantages, with one such disadvantage being the cost of the focusing module. Due to the threads required on the members to focus the laser light and permit axial movement between the cylindrical members, the cylindrical members had to be precisely machined, which is relatively expensive with respect to other metal working techniques and which consequently increased the cost of the end product in which the focusing module was used.

Another disadvantage in the prior art was that the lens was seated directly on a washer-like surface of one of the cylindrical members, which necessitated that this surface have a forward taper to match the portion of the profile of the lens surface with which it contacted, in order to align and maintain a coaxial orientation of the lens axis with the central axis of the members. If the washer-like surface were normal to the annular portions, the seat would be made through contact with the innermost ledge of the washer, making the lens susceptible to tilting and chipping. On the other hand, a tapered surface provided a ring of contact by the seat, avoiding the above, but this taper required that the washer-like surface be machined off a right angle portion of the surface, resulting in a forward annular portion of relatively small radius. Therefore, the opening in the front of the cylindrical member was smaller than desirable, and served to mask the light which passed through the lens, decreasing the intensity of the focused spot. The intensity of the beam passing through the opening is critical in applications such as bar code scanning, wherein reliability is a function of the sharpness of the reflected light as well as the intensity. To compensate for this loss of intensity, the prior art focusing module had to be precisely aligned with respect to the emission axis, thereby achieving a more discretely focused spot at the point of scanning; however, this precision required the dimensional tolerances of the members of the focusing module to be very small, which could only be achieved by machining the critical dimensions at a high cost. Dimensions of the threaded interfaces were critical, and had to prevent even marginal axial and radial movement between the cylindrical housing members which would result in misalignment of the lens and decrease focusing of the emitted light, causing an asymmetrical intensity pattern at the point of focus.

A further disadvantage laid in that the opening of the focusing module for emission of laser light had to be circular by this design, since any other shape would not maintain its orientation with respect to the laser diode about the central axis after the cylindrical members were rotated in the focusing operation. Therefore not only was the focusing module opening circular, it had to be of small diameter, and had the further effect of limiting the focused intensity for the scanning operation.

A still further disadvantage was encountered during the focusing process, when one cylindrical housing member was rotated with respect to the other. Since the lens made direct contact with the rotating cylindrical member and the stationary spring, the lens rotated with respect to the cylindrical housing member, the positioning spring, or both. This relative rotation tended to misalign the central axis of the lens, and led to scratching or scoring of the lens as it moved relative to the housing member and spring.

SUMMARY OF THE INVENTION

The present invention eliminates or substantially ameliorates the disadvantages encountered in the prior art through the provision of a highly accurate focusing module of relatively simple and inexpensive contruction.

It is an object of the present invention to provide a relatively inexpensive and lightweight focusing module for a divergent light source such as a laser diode.

Another object of the present invention is to provide a focusing module of successively received cylindrical housing members which focuses without rotating the members with respect to one another about their central axis.

A further object of the present invention is to provide a focusing module where the lens glass does not rest directly upon the lens holder of the focusing module.

A still further object of the present invention is to provide a focusing module where the cylindrical members permit focusing and are secured together in a focused position, the constructional tolerances between the members being such so as to allow the members to be spin formed, rather than machined.

Yet another object of the present invention is to provide a focusing module where the members are constructed to allow the angular alignment of the focusing lens to be marginally adjusted so that its center axis is coaxial with the center axis of the divergent light thereby allowing a focus of symmetric intensity.

Another object of the present invention is to provide a focusing module where the converging light emitting from the focusing module passes through an opening having a shape and orientation conforming to the cross section of the emitted beam, and whose radial orientation with respect to the emission axis remains constant during focusing.

Consistent with these objectives and in accordance with the present invention, a focusing module particularly adapted for use with a laser diode comprises:

(a) A cylindrical diode holder having a first annular portion for receiving a laser diode, adapted to center and receive the base therein and adapted to interface with the diode to prevent axial rotation of the diode with respect to the diode holder;

(b) A cylindrical lens holder adapted to slide axially within the diode holder, having an annual seating portion at a first end thereof, and adapted to interface with the diode holder at the opposite end thereof to prevent axial rotation of the lens holder with respect to the diode holder;

(c) An optical lens assembly particularly adapted for use with the laser diode, and being mounted within the annular seat defined by the first end of the lens holder; and (d) A spring means for urging the lens assembly into engagement with the annular seat;

whereby the lens holder may be slid within the diode holder to focus the output of the laser diode through the lens assembly, and then be secured thereto in a focused state.

Since the emission of a laser diode has no unique focusing properties the focusing module described can be used generally with any divergent light source. The following discussion will focus on the laser diode as the focused source.

The cylindrical lens holder and diode holder can be made of any lightweight metal, such as brass, and may be shaped to provide the successive annular portions by spin forming. Other materials, such as some plastics, may also be formed into the requisite shape in an inexpensive manner. Therefore, relatively expensive constructional processes such as machining are not required.

The cylindrical lens holder and diode holder (collectively referred to as "cylindrical members") interface with a notch and key feature which runs in the direction of the central axis along portions of the cylindrical members. This feature prevents rotation of the cylindrical members with respect to one another about the central axis. A similar notch and key mechanism between the received portion of the base of the laser diode and the receiving diode holder prevents relative rotation about the central axis of the laser diode and the diode holder. Since the successive cylindrical members are interlocked, the complete focusing module cannot rotate with respect to the laser diode about the central axis, thereby enabling the opening at the front end of the focusing module to remain fixed with respect to the cross section normal to the central axis of the light emitted. Therefore, the opening of the focusing module may be cut in a shape corresponding to that of the cross section of the emitted light, allowing more light to be focused.

Focusing of the focusing module is achieved by sliding the lens holder with respect to the diode holder along the direction of the central axis. Again, relative rotation around the axis is not needed, and is in fact not possible due to the interlocking key features. The tolerances between the cylindrical members allow some angular adjustment of the central axis of the lens. When the desired focus is achieved, the members are permanently fixed relative to one another, which depending on the material of which the members are constructed, can be done in a number of ways using a variety of materials and methods, including adhering by adhesives such as glue or epoxy, fastening by staking, spot-welding, ultra-sonic welding, or the like.

The lens glass is surrounded and supported in an integral lens assembly, the lens assembly having torroidal shape with two portions of differing outer radii. The lens assembly makes contact with the seat at a washer-like surface of the lens holder and is supported at this point. Since this surface is flat and normal to the lens assembly's central axis, the lens seat need not be a tapered surface as in the prior art.

The lens assembly remains static with respect to the lens holder along the central axis of the lens holder due to a compressed positioning spring forcing it against the seat in the axial direction. Alternatively, the lens assembly may be adhered to the lens seat, eliminating the need for the spring. The spring interfaces at one end with the base of the laser diode and at the other with the lens assembly so that neither the lens nor the diode emitter are in danger of scratching or scoring during the focusing movements. The lens assembly is received in the smaller annular portion of the lens holder which extends forward from the washer-like seating surface. The lens assembly fits securely within the forward annular portion of the lens holder, thereby maintaining a coaxial relation between the central axis of the lens and the lens holder.

BRIEF DESCRIPTION OF THE DRAWINGS

The foregoing objects and other features of the invention will become more readily apparent and may be understood by referring to the following detailed description of a preferred embodiment of the focusing module, taken in conjunction with the accompanying drawings, in which:

FIG. 1b is a front view of the focusing module of FIG. 1a, taken along lines 1b—1b in FIG. 1a.

FIG. 2b is a front view of the laser diode of FIG. 2a, taken along line 2b—2b of FIG. 2a;

FIG. 3b is a side view of the diode holder of FIG. 3a, taken along line 3b—3b of FIG. 3a;

FIG. 3c is a partial side view of the diode holder of FIG. 3a, taken along line 3c—3c of FIG. 3a;

FIG. 4b is a side sectional view of the lens holder of the focusing module, taken along line 4b—4b of FIG. 4a;

FIG. 4c is a front view of another embodiment of the lens holder similar to that of FIG. 4a;

FIG. 5b is a front view of the laser diode received in the positioning spring of FIG. 5a, taken along line 5b—5b of FIG. 5a;

DETAILED DESCRIPTION OF THE PREFERRED EMBODIMENTS

Figure 2A:
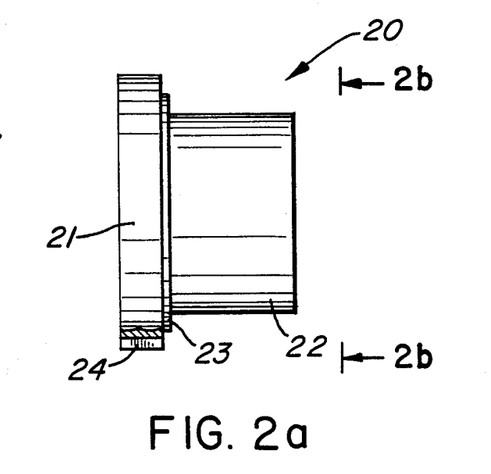
FIG. 2a is a side elevational view of a conventional laser diode.
Figure 2B:
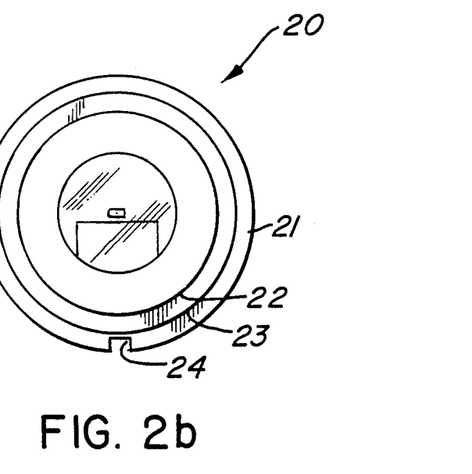

Referring now in specific detail to the drawings, in which identical reference numerals identify similar or identical elements throughout the several views, in FIGS. 2a and 2b, there is shown a laser diode 20 which provides the divergent laser light to be focused by the present invention.

The laser diode 20 is a typical structure of laser diodes available commercially. Commercially available laser diodes structured in this manner include the Non-Contact L58300/L56100 by Sony or Toshiba, or the Non-Contact L58500 by Sony or Toshiba.

The dimensions given in the following description correspond to a particular representative embodiment of a focusing module, constructed according to the present invention, and are in no way to be considered as limiting. The dimensions given would enable the use of the focusing module with the above mentioned laser diodes.

Figure 1A:
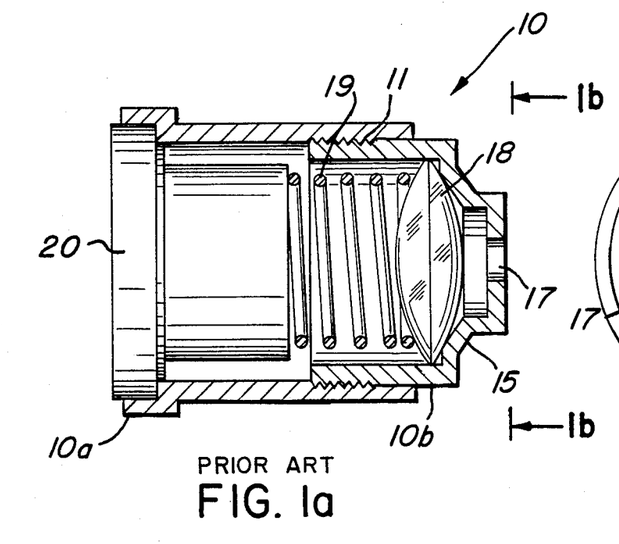
FIG. 1a is a side sectional view of a focusing module mounted on the base of a laser diode, as embodied in the prior art.
Figure 1B:
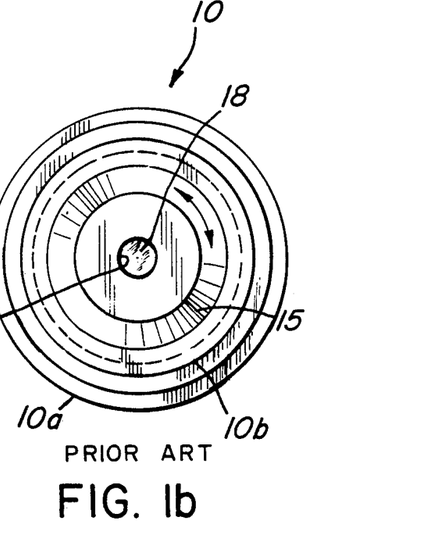

Referring to FIGS. 1a and 1b, the laser diode 20 is shown with the prior art embodiment of a focusing module 10, having a threaded interface 11 between members 10A and 10B, which allows for focusing. The lens glass 18 is urged by a spring 19 to rest directly on the sloped seating portion 15 of member 10B, which is also provided with emission opening 17, circular in shape and of considerably smaller diameter than lens glass 18. Focusing of prior art module 10 is accomplished by rotation of member 10B with respect to member 10A.

Figure 4A:
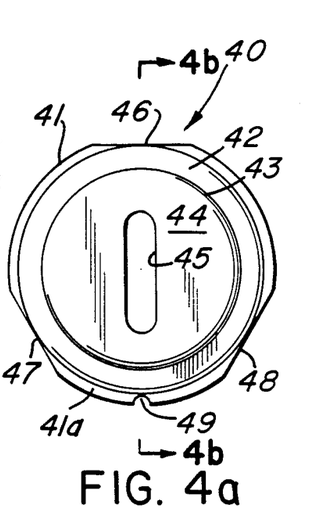
FIG. 4a is a front view of a lens holder of a focusing module according to the present invention.
Figure 4B:
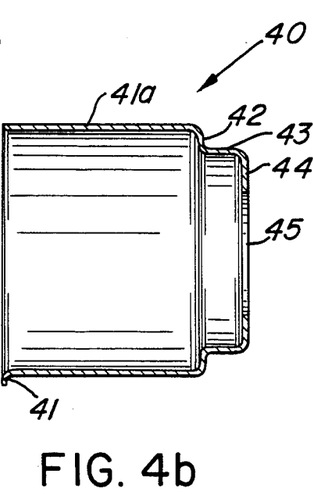
Figure 4C:
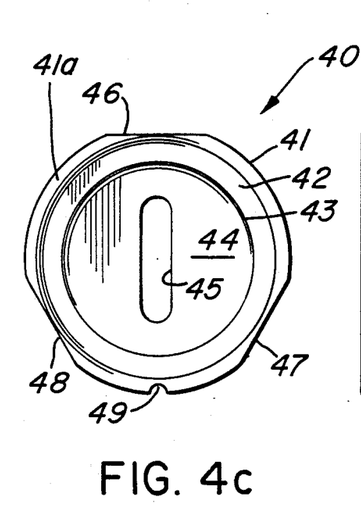
Figure 5A:
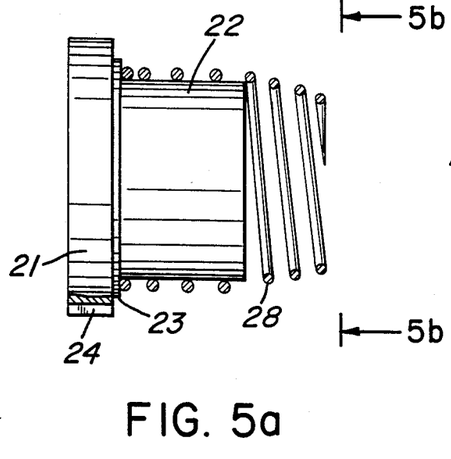
FIG. 5a is a side view of the laser diode received within the positioning spring.
Figure 5B:
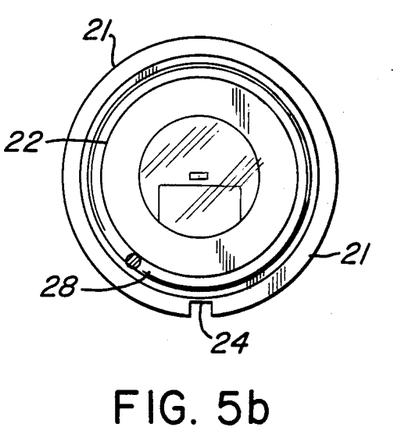
Figure 6:
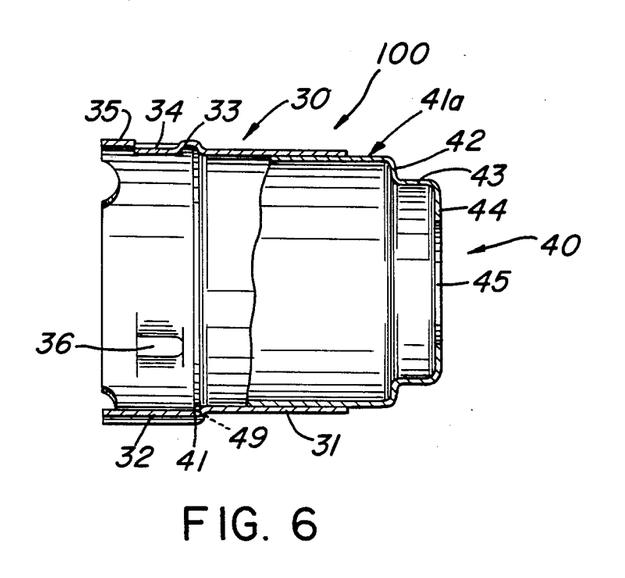
FIG. 6 is a partial sectional side view of the focusing module of the present invention showing the diode holder with the lens holder received therein.
Figure 7:
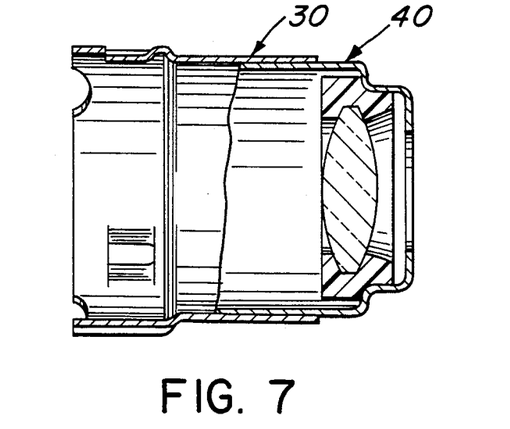
FIG. 7 is a partial sectional side view of the focusing module of the present invention showing the diode holder and lens holder with the lens holder received by the lens holder.
Figure 8:
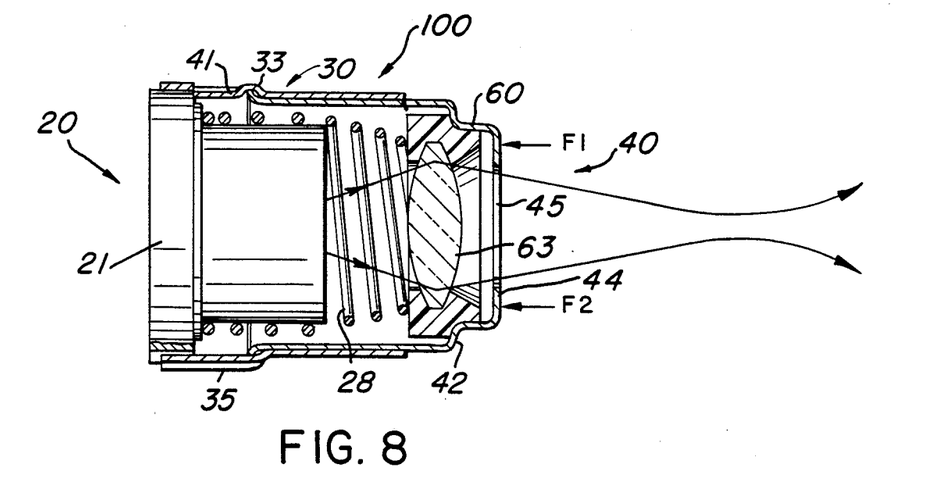
FIG. 8 is a cutaway side view of the operation of the completely assembled focusing module, with a laser diode mounted therein.
Figure 9:
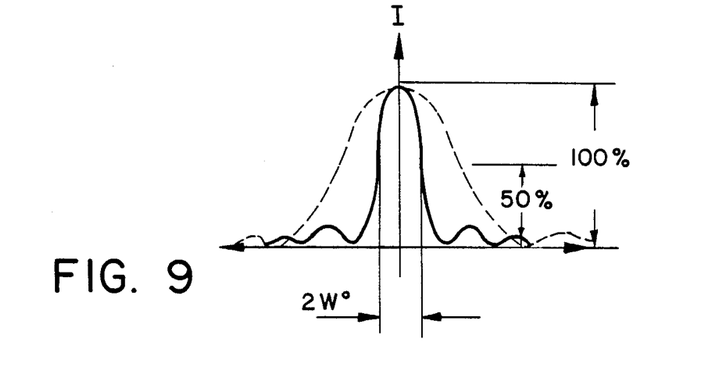

FIGS. 3-8 show a particular embodiment of the focusing module of the present invention. As best shown in FIGS. 6-8, the focusing module 100 of the present invention has a diode holder 30, a lens holder 40, and a lens assembly 60 which seats at the front end of the interior of lens holder 40.

Figure 3A:
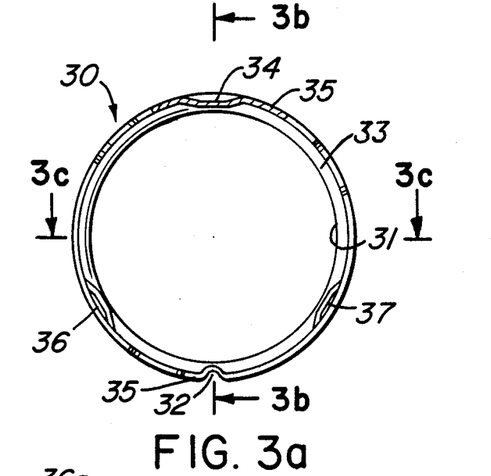
FIG. 3a is a front view of a diode holder of a focusing module according to the present invention.
Figure 3B:
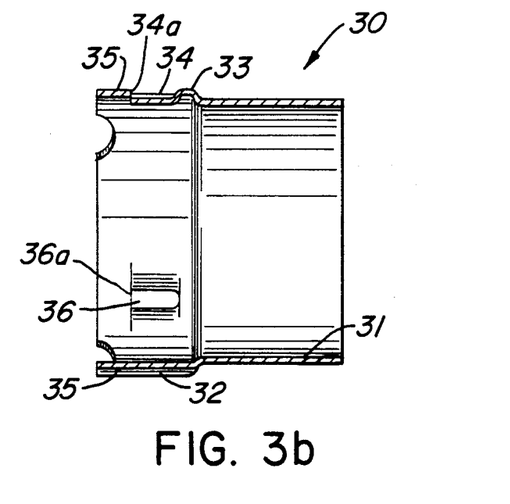
Figure 3C:
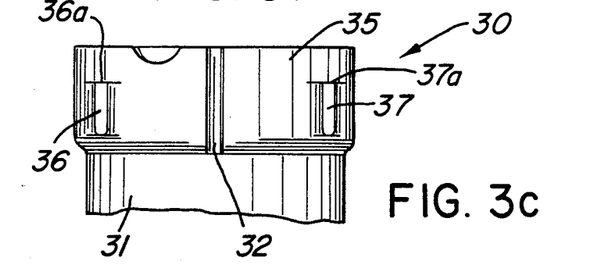

Referring to FIGS. 3a, 3b, and 3c, the diode holder 30 of the focusing module 100 is shown. The diode holder 30 is preferably of thin-walled construction as seen in FIGS. 3a and 3b, and has a first annular portion 35 and a second annular portion 31 of smaller radius than that of the first annual portion 35. In the representative embodiment, first annular portion 35 is on the order of 355 mil in inner diameter, and second annular portion 31 is on the order of 326 mil in inner diameter, both having a tolerance of approximately 1 mil.

The diode holder 30 and lens holder 40 are typically made of a light gauge metal, such as brass, and are preferably spin formed using standard spin forming and cutting techniques, but may also be formed by other known techniques such as drawing or stamping. These members 30 and 40 may also be molded of a lightweight rigid plastic material such as phenolic resins or other high impact plastics.

FIG. 3a shows a front or radial view of the diode holder 30 and demonstrates that the tubular shape of the diode holder 30 is primarily hollow. The thickness of the walls of the first annular portion 35 may be on the order of 6 mil, for example, and is therefore relatively thin compared to the diameter of the first annular portion 35. The cross-section shows the second annular portion 31 having a thickness likewise on the order of 6 mil and is therefore relatively thin compared to the diameter of the second annular portion 31. The first annular portion 35 and the second annular portion 31 connect through the sloping washer-shaped surface 33 whose radial surface has a width on the order of 6 mil and extends axially on the order of 20 mil.

Referring to FIG. 3b, in the representative embodiment the first annular portion 35 extends axially on the order of 125 mil, for example. The entire length of the diode holder 30 which is the net length of the first annular portion 35 and the second annular portion 31 is on the order of 325 mil.

Spaced equidistantly around the first annular portion 35 are a series of indentations extending radially inward, shown in FIGS. 3a, 3b, and 3c as a series of punches 34, 36, and 37. The punches 34, 36, and 37 are formed using standard shear or stamping technology, in which the shear portions 34a, 36a, and 37a, extend circumferentially along the rearward portion of the punch, shown most clearly by punch 36 of FIG. 3b. These shear portions 34a, 36a, and 37a further act as a stop to define the limit of reception of the base 21 of the laser diode 20 in the focusing module 100. To achieve proper axial orientation between the focusing module 100 and the laser diode 20 the distance between the shear portions 34a, 36a, and 37a and the rear axial end of the first annular portion 35 is uniform and is preferably equivalent to the axial length of base 21 of diode 20, and generally is on the order of 46 mil with a tolerance of 1 mil, in the representative embodiment.

The first annular portion 35 also has an inward indentation or groove 32 extending in the axial direction along the length of the first annular portion, as shown in FIGS. 3a–3c, and is best seen in FIG. 3c which clearly shows the groove 32 extending in the axial direction. The groove 32 extends radially inwardly so that its innermost extension has approximately the same radial distance as the inner radius of the second annular portion 31, the latter on the order of 326 mil. The groove 32 interfaces with a notch 24 shown in FIGS. 2a and 2b, extending in the axial direction of the length of base 21 of the laser diode 20 thereby preventing rotation of the diode 20 with respect to the center axis of the diode holder 30 when the diode 20 is received in the diode holder 30. Referring back to FIGS. 3a, 3b, and 3c, the inward groove 32 is stamped into diode holder 30 or pressed into the holder by a pressing operation.

Referring to FIGS. 4a, 4b and 4c, the lens holder 40 of the focusing module is shown, and as best seen in FIGS. 4a and 4b, the lens holder 40 has a flange portion 41, a rear annular portion 41A of radius smaller than the flange 41, and a forward annular portion 43 of radius smaller than the rear annular portion. The radially positioned washer-like surface connecting the rear annular portion 41A and the forward annular portion 43 forms the seating surface 42 for the lens assembly 60 as shown in FIG. 7 and described below. The front end of the lens holder 40 is a closed disk-like surface 44 with an opening 45 through which the laser light is emitted and which corresponds in shape to the cross-sectioned shape of the laser light beam. This shape is generally an oblong shape, such as but not limited to, an ellipsoidal shape. In FIG. 4a, three cuts 46, 47, and 48 in the flange 41, are shown and their function will be described below. In the projection along the center axis of FIG. 4a, the linear midpoint of these cuts is tangent to the outer surface of the rear annular portion 41A. This is also shown in FIG. 4b, where the cut 46 conforms the cut portion of the flange 41 and rear annular portion at the particular cross-section of FIG. 4b. The flange 41 further has a radially extending notch 49, which as seen in FIG. 4a, extends radially inwardly so that its innermost radial extension is approximately equivalent to the outer radius of the rear annular portion 41A. In a second embodiment of the lens holder 40 shown in FIG. 4c, the cuts 46, 47, and 48, and notch 49 may approach the washer-like surface projection but are not tangential to it.

The ellipsoidal opening 45 of lens holder 40 has its center point aligned with the central axis of the lens holder 40. The semi-major axis of ellipsoidal opening 45 bisects fitting notch 49 and also bisects cut 46 of flange 41 in the two dimensional projection in FIG. 4a. The semi-major axis of the ellipsoidal opening 45 in the representative embodiment may be approximately 160 mil and the semi-minor axis may be approximately 35–50 mil, depending on the particular laser diode used.

The lens holder 40 is received within the diode holder 30 as shown in FIG. 6. To achieve reception, the closed front end 44 of the lens holder 40 is moved coaxially into the radial opening of the diode holder 30 defined by the first annular portion 35 toward the radial opening at the opposite end of the diode holder 30 defined by the second annular portion 31. The rear annular portion 41A of the lens holder 40 has an outer radius only marginally smaller than the second annular portion 31 of the diode holder 30 thereby having a frictional engagement and maintaining the coaxial positioning of the diode holder 30 and the lens holder 40. The first annular portion 35 of the diode holder 30 receives the flange 41 (not shown in FIG. 6) of the lens holder 40. The flange 41 has radius marginally smaller than the radius of the first annular portion 35 thereby allowing reception. However, the flange 41 has radius larger than the second annular portion 31 of the diode holder 30 thereby preventing further reception in the axial direction of the lens holder 40 by the diode holder 30 when the flange 41 comes in contact with the washer-like surface 33 of the diode holder 30. The flange 41 freely travels in an axial direction past punches 34, 36, and 37 (not shown in FIG. 6) in the first annular portion 35 due to the cuts 46, 47, and 48 (not shown in FIG. 6) on the flange 41.

The received lens holder 40 is prevented from rotating about the center axis with respect to the diode holder 30 due to the notch 49 in the flange 41 of the lens holder 40 which interfaces with the groove 32 in the first annular portion 35 of the diode holder 30.

Referring again to FIGS. 4a, 4b, and 4c, the lens holder 40 has relative dimensions as defined above as well as the following for the representative embodiment: the thickness of the flange 41 rear annular portion 41A and forward annular portion 43 are on the order of 6 mil. The seating surface 42 has a surface width of approximately 37 mil, and a tolerance of approximetaly 1 mil. The seating surface 42 is normal to the central axis except for the bending at the point of contact with the annular portions 41A and 43. The inner diameter of the forward annular portion 43 is on the order of 250.5 mil, with a tolerance on the order of 1 mil. The outer diameter of the rear annular portion 41A is on the order of 324.8 mil with tolerance on the order of 0.5 mil. The outer diameter of the flange 41 is on the order of 352.5 mil with tolerance of the order of 0.5 mil. The length of the rear annular portion 41A is approximately 262 mil with a tolerance of approximately 1 mil. The length of the forward annular portion 43 is approximately 66 mil with a tolerance on the order of 1 mil.

Referring to FIGS. 5a and 5b, the positioning spring 28 of the focusing module 100 is shown interfacing with the base of the laser diode 20. The positioning spring 28 receives the cylindrical extension 22 of the diode 20. The positioning spring 28 has an unextended radius relatively smaller than the cylindrical extension 22; therefore the portion of the positioning spring 28 receiving the laser diode 20 provides an inward radial force on the base 21 of the diode 20 and the non-receiving portion of the positioning spring 28 tapers along its length. The positioning spring 28 receives the cylindrical extension 22 completely, so that one end of the positioning spring 28 rests on the ledge 23 of the base 21 of the laser diode 20.

FIG. 7 shows the lens assembly 60 of the focusing module 100 positioned in the focusing module 100. Shown in FIG. 7 is the lens holder 40 received in the diode holder 30 as described above with reference to FIG. 6. The focusing lens glass 63 is an integral part of lens assembly 60 and the central axis of the focusing lens 63 coaxially positioned with respect to the central axis of the lens assembly 60. Such lens assemblies are available commercially, and the model A-365 manufactured by Kodak is used in a preferred embodiment. The lens assembly 60 has an outer radius smaller than the rear annular portion 41A of the lens holder 40 but larger than the radius of the forward annular portion 43; the front face 64 of the lens assembly 60 rests upon the seating surface 42 providing an axial stop for the lens assembly 60. A ring extension 62 of the lens assembly 60 has outer diameter only marginally smaller than forward annular portion 43 thereby preventing radial movement of the lens assembly 60 with respect to the lens holder 40 and achieving a coaxial positioning of the focusing lens assembly 60, the diode holder 30, and lens holder 40.

Referring to FIG. 8, as described above, the diode holder 30 cannot rotate with respect to the received diode 20 and the received lens holder 40 cannot rotate with respect to the diode holder 30. Accordingly, the ellipsoidal opening 45 cannot be rotated axially with respect to the laser diode 20 and the cross-section of the emitted laser light approximately matches opening 45.

When the laser diode 20 is received in the focusing module 100, the positioning spring 28 is compressed against the lens assembly 60 forcing it in the axial direction against seating surface 42. The forward force against the seating surface is transmitted to the diode holder 30 at the washer-like surface 33 of the diode holder 30 by the flange 41 of the lens holder 40. This results in a forward axial force on the diode holder 30 with respect to the base 21 of the laser diode 20; therefore to receive the laser diode 20 in the diode holder 30, a force (shown as F1 and F2) is provided at the closed front end 44 to counteract this resulting force from the compressed positioning spring 28. When the force enables maximum reception of the base 21 of the laser diode 20 as defined by the punches 34, 36 and 37 on the first annular portion 35 of the diode holder 30, an adherent is applied at points where the base 21 of the laser diode 20 is received and allowed to cure, thereby affixing the base 21 of the laser diode 20 to the diode holder 30.

With the laser diode 20 affixed, the compressed positioning spring 28 forces forward axial movement of the lens holder 40 until the flange 41 rests on the washer-like surface 33 of diode holder 30. With the laser diode 20 energized, light emitted with an axial component passes through the lens assembly 60 and through the ellipsoidal opening 45. The focusing is adjusted by reapplying a force (shown in FIG. 8 as F1 and F2) at the closed front end 44 of lens holder 40, thereby sliding the lens holder 40 and lens assembly 60 in a rearward axial direction with respect to the diode holder 30. When focusing is achieved, forces F1 and F2 may be adjusted slightly due to the tolerances in the cylindrical members, which causes the central axis of the lens to be concentrically aligned with the central axis of the light emission, thereby achieving a symmetric intensity pattern. Once achieved, adherents such as described above are applied at points where the diode holder 30 and the lens holder 40 contact, and allowed to cure before the force is removed so that precise focusing is maintained.

What is claimed is:

1. A focusing module particularly adapted for use with laser diode assembly including a laser diode for emitting a laser beam having a non-radially symmetric cross-section comprising:

(a) a cylindrical assembly holder for said laser diode assembly having a first open end defining a first annular portion for receiving said laser diode assembly and a second open end defining a second annular portion of smaller diameter than that of said first annular portion, said assembly holder being arranged to concentrically receive said laser diode assembly therein and adapted to orient the laser beam cross section with respect thereto and prevent axial movement and rotation of said laser diode assembly also with respect thereto;

(b) a cylindrical lens holder adapted to slide coaxially and concentrically within said cylindrical assembly holder and extend from said second open end of said cylindrical assembly holder, said lens holder having an open end defining a first annular portion of a diameter similar to but smaller than the diameter of said second annular portion of said cylindrical assembly holder, and a closed end having an aperture and defining a second annular portion of a diameter smaller than that of said first annular portion of said lens holder, said lens holder having means to interface with said assembly holder at said open end of the lens holder to prevent rotation of said lens holder with respect to said assembly holder;

(c) an optical lens assembly particularly adapted for use with said laser diode assembly being mounted within a seating portion connecting said first and second annular portions of said lens holder; and (d) means for providing an axial force for urging said lens assembly into engagement with said seating portion;

whereby said lens holder may be axially moved and positioned within said assembly holder to focus the laser beam after said laser beam passes through said lens assembly and said aperture prior to securement of said lens holder to said assembly holder in a focused state.

2. The focusing module according to claim 1, wherein said laser diode assembly is a cylindrical container having an aperture on a planar end thereof through which said laser beam is emitted.

3. The focusing module according to claim 1, wherein said first annular portion of said cylindrical assembly holder includes inwardly extending indentations which limit the reception of said laser diode assembly.

4. The focusing module according to claim 3, wherein said inwardly extending indentations are formed by shearing said first annular portion such that said indentations are punched at points equidistant about the circumference of said first annular portion.

5. The focusing module according to claim 1, wherein said seating portion is perpendicular to said annular portions.

6. The focusing module according to claim 1, wherein said first and second annular portions of said cylindrical assembly holder are connected by an integral wall member perpendicular to said first and second annular portions.

7. The focusing module according to claim 1, wherein said cylindrical assembly holder includes a radially inwardly directed groove extending axially along the length of said first annular portion of said cylindrical assembly holder for mating with a corresponding fitting notch provided in a flange extending about said open end of the lens holder.

8. The focusing module according to claim 7, wherein said laser diode assembly has a base portion having means for interfacing with said first annular portion of said assembly holder to prevent rotation of said laser diode assembly with respect to said assembly holder, said means for interfacing comprising an axially extending fitting notch corresponding to said groove in said assembly holder.

9. The focusing module according to claim 1, wherein said means for providing an axial force comprises spring means having first and second ends.

10. The focusing module according to claim 9, wherein said first end of said spring means contacts said laser diode assembly and said second end of said spring means contacts said lens assembly.

11. The focusing module according to claim 10, wherein said first end of said spring means rests against a base portion of said laser diode assembly, and wherein said spring means is in compression when said focusing module is assembled.

12. The focusing module according to claim 11, wherein said spring means is a spring which continuously tapers in decreasing radius in the axial direction toward the second end of said spring.

13. The focusing module according to claim 1, wherein said aperture of said lens holder has an oblong shape for emission of light from said laser diode assembly.

14. The focusing module according to claim 13, wherein said aperture of said lens holder has rectangular shape.

15. The focusing module according to claim 1, wherein said assembly holder and said lens holder are constructed of a metallic material.

16. The focusing module according to claim 15, wherein said metallic material is selected from the group consisting of brass, aluminum and light-gauge steel.

17. The focusing module according to claim 1, wherein said assembly holder and said lens holder are molded of thermoplastic material.

18. The focusing module according to claim 1, wherein said assembly holder is secured to said lens holder in said focused state by welding, soldering, gluing or the like.

19. The focusing module according to claim 1, wherein said laser diode assembly is secured to said assembly holder by crimping, staking, welding, soldering, gluing or the like.

20. The focusing module according to claim 1, wherein said assembly holder and said lens holder are frictionally engaged to allow for adjustment of said lens holder with respect to said assembly holder along a central axis of said assembly holder and said lens holder to achieve focusing of the emitted light from said laser diode assembly.

21. A method of focusing a laser beam emitted from a laser diode assembly, comprising the steps of:
 (a) providing a first cylindrical housing member having two open ends for frictionally receiving a second cylindrical housing member therein, said second housing member having an open end and a closed end, said closed end positioned remote from said first housing member and having an aperture, said second housing member further having an optical lens element mounted therein adjacent said closed end;
 (b) providing said laser diode assembly within said first housing member and secured thereto, and maintaining a concentric axial alignment between said laser diode assembly, said first housing member, said second housing member, and said lens element;
 (c) providing an axial force urging said lens element away from said laser diode assembly within said first and second housing member;
 (d) reciprocating said second cylindrical housing member within said first cylindrical housing member along an axis of said concentric axial alignment, thereby varying the distance between said laser diode assembly and said lens element for focussing the laser beam on a predetermined image plane; and
 (e) securing said second housing member to said first housing member subsequent to focusing to maintain said laser beam in focus on said image plane.

22. A method according to claim 21, wherein said laser diode assembly is a cylindrical container having an exit window on a planar end thereof through which said laser beam is emitted.

23. A method according to claim 21, wherein said lens element is seated within said second housing member at an annular portion of reduced diameter at said closed end of said second housing member.

24. A method according to claim 21 wherein said laser diode assembly is received within a first annular portion of said first housing member and is limited by inwardly extending indentations in said first annular portion.

25. A method according to claim 21, wherein said reciprocating step allows movement in an axial direction, and rotational movement in a radial direction being prevented by a radially inwardly directed groove extending axially along the length of said first annular portion of said first housing member and a corresponding fitting notch provided in a flange at the open end of said second housing member.

26. A method according to claim 25, wherein radial rotation of said laser diode assembly is prevented by said groove and a corresponding notch in said laser diode assembly.

27. A method according to claim 25, wherein said reciprocating step includes said second housing member with respect to said first housing member to align said axis so that a focused output has uniform intensity.

28. A method according to claim 21, wherein said axial force positioning said lens element within said second housing member is accomplished by use of a spring.

29. A method according to claim 21, wherein said aperture at said closed end of said second housing member has a rectangular shape for emission of light from said laser diode assembly.

30. A method of fabricating an optical component such as a laser diode assembly, comprising the steps of:
 (a) drawing or stamping a light gauge metal material to form a first cylindrical housing member, said first housing member having an open end;
 (b) drawing or stamping a light gauge metal material to form a second cylindrical housing member, said second housing member having an open end and a closed end, said closed end having an aperture;
 (c) providing a first optical component within said first housing member and a second optical component in said second housing member;
 (d) positioning said first and said second housing members in telescoping relationship; and
 (e) providing an axial force urging said first and second housing members into a fixed longitudinal spaced relationship thereby focusing a light beam transmitted between said first and second optical components.

31. A method according to claim 30, further comprising the step of securing said second housing member to said first housing member subsequent to providing said axial force to maintain said first and second housing members in a fixed predetermined focus position.

32. A method according to claim 30, wherein said first optical component is a semiconductor laser diode having an exterior surface.

33. A method according to claim 32, further comprising the step of stamping inwardly extending indentations in said first housing member to form a first annular portion in said first housing member for receiving and positioning said laser diode therein.

34. A method according to claim 32, further comprising the step of forming a radially inwardly directed groove extending axially along the length of said first annular portion of said first housing member.

35. A method according to claim 34, wherein said laser diode includes a notch in said exterior surface so that when said laser diode is provided in said first housing member rotation of said laser diode is prevented by engagement of said notch in said laser diode with said groove.

36. A method according to claim 30, wherein said second optical component is a lens element seated at an annular portion of reduced diameter adjacent said closed end of said second housing member.

37. A method according to claim 30, further comprising the step of forming an aperture at said closed end of said second housing member, said aperture having a rectangular or ellipsoidal shape.

* * * * *